(12) United States Patent
Rohleder et al.

(10) Patent No.: US 10,289,871 B2
(45) Date of Patent: May 14, 2019

(54) INTEGRATED CIRCUIT LIFECYCLE SECURITY WITH REDUNDANT AND OVERLAPPING CROSSCHECKS

(71) Applicant: Freescale Semiconductor, Inc., Austin, TX (US)

(72) Inventors: Michael Rohleder, Unterschleissheim (DE); Stefan Doll, Munich (DE); Clemens Alfred Roettgermann, Munich (DE)

(73) Assignee: NXP USA, Inc., Austin, TX (US)

( * ) Notice: Subject to any disclaimer, the term of this patent is extended or adjusted under 35 U.S.C. 154(b) by 206 days.

(21) Appl. No.: 14/930,194

(22) Filed: Nov. 2, 2015

(65) Prior Publication Data

US 2017/0124354 A1    May 4, 2017

(51) Int. Cl.
   *G06F 21/00*    (2013.01)
   *G06F 21/70*    (2013.01)
   *G09C 1/00*    (2006.01)
   *G06F 21/62*    (2013.01)

(52) U.S. Cl.
   CPC .......... *G06F 21/70* (2013.01); *G06F 21/6218* (2013.01); *G09C 1/00* (2013.01); *H04L 2209/26* (2013.01)

(58) Field of Classification Search
   CPC ..................................................... G06F 21/70
   USPC ........................................................ 726/30
   See application file for complete search history.

(56) References Cited

U.S. PATENT DOCUMENTS

| 7,558,839 | B1 | 7/2009 | McGovern | |
|---|---|---|---|---|
| 8,321,686 | B2 | 11/2012 | Holtzman et al. | |
| 2005/0028114 | A1* | 2/2005 | Gould | G06F 9/4498 326/46 |
| 2010/0306577 | A1* | 12/2010 | Dreifus | G11O 29/76 714/6.12 |
| 2012/0118190 | A1 | 5/2012 | Fisher | |
| 2013/0253868 | A1 | 9/2013 | Bansal et al. | |

(Continued)

FOREIGN PATENT DOCUMENTS

| WO | 2009104028 A | 11/2009 | |
|---|---|---|---|
| WO | WO-2016043962 A1 * | 3/2016 | G06F 21/71 |
| WO | WO 2016043962 A1 * | 3/2016 | G06F 21/71 |

OTHER PUBLICATIONS

Joye M. et al.: "Strengthening Hardware AES implementations Against Fault Attacks", vol. 1, No. 3, Sep. 10, 2007, pp. 106-110.
(Continued)

*Primary Examiner* — Alexander Lagor
*Assistant Examiner* — Syed M Ahsan

(57) ABSTRACT

An integrated circuit includes a security module with multiple stages arranged in a pipeline, with each stage executing a different operation for accessing stored lifecycle (LC) information. For each portion of LC being accessed, each stage performs N iterations of its corresponding operation, whereby N is an integer greater than two, and crosschecks the results of successive iterations to ensure that the results of the operation are consistent. In addition, the stages of the security module are overlapping, such that different stages can perform different iterations concurrently. These concurrent operations at different stages are organized such that they may also be crosschecked and thereby confirm "offset" results between the stages.

18 Claims, 6 Drawing Sheets

(56) References Cited

U.S. PATENT DOCUMENTS

2013/0304651 A1* 11/2013 Smith ................ G06Q 20/3227
705/67
2014/0176116 A1* 6/2014 Kumar ............... G01R 31/2858
324/76.41
2017/0249099 A1* 8/2017 Jun ....................... G06F 3/0637

OTHER PUBLICATIONS

Hamid Choukri et al.: "Round Reduction Using Faults", Fault Diagnosis an Tolerance in Cryptography, FDTC 2005, Sep. 2, 2005, pp. 13-24.

* cited by examiner

INTEGRATED CIRCUIT LIFECYCLE SECURITY WITH REDUNDANT AND OVERLAPPING CROSSCHECKS

BACKGROUND

Field of the Disclosure

The present disclosure relates generally to integrated circuits and more particularly to security for integrated circuits.

Description of the Related Art

An integrated circuit (IC) can employ lifecycle information to support security features and associated operations for the IC. As the IC is moved through the different stages of manufacture and production, the lifecycle information is altered to indicate the current stage for the IC. For example, the lifecycle information can be set to an initial state at a manufacturing stage of the IC, and then changed to a different state when the IC is provided to a device manufacturer for incorporation into an electronic device. The lifecycle information can be used to, for example, restrict access to selected information and settings for the IC, so that the information and settings are only authorized to be accessed during selected stages of the IC lifecycle. Thus, for example, the lifecycle information can be used to restrict access to internal information of the IC (i.e., an access key), so that this information is accessible to a manufacturer of the IC during a manufacturing stage, but not to an end user of the IC.

The lifecycle information used by the IC can itself be subject to unauthorized access and therefore render the security features its supports vulnerable. For example, the lifecycle information is typically stored in an alterable location within the IC, such as within a non-volatile memory (NVM), to permit advancing the lifecycle. To protect the lifecycle information, the IC provides only limited access to this location; with the access itself controlled by the lifecycle information. However, the control logic for permitting or restricting such access to the lifecycle information is also vulnerable to different kinds of attack, such as incomplete or terminated reading, inhibiting the storage to internal registers, or any kind of voltage attacks).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
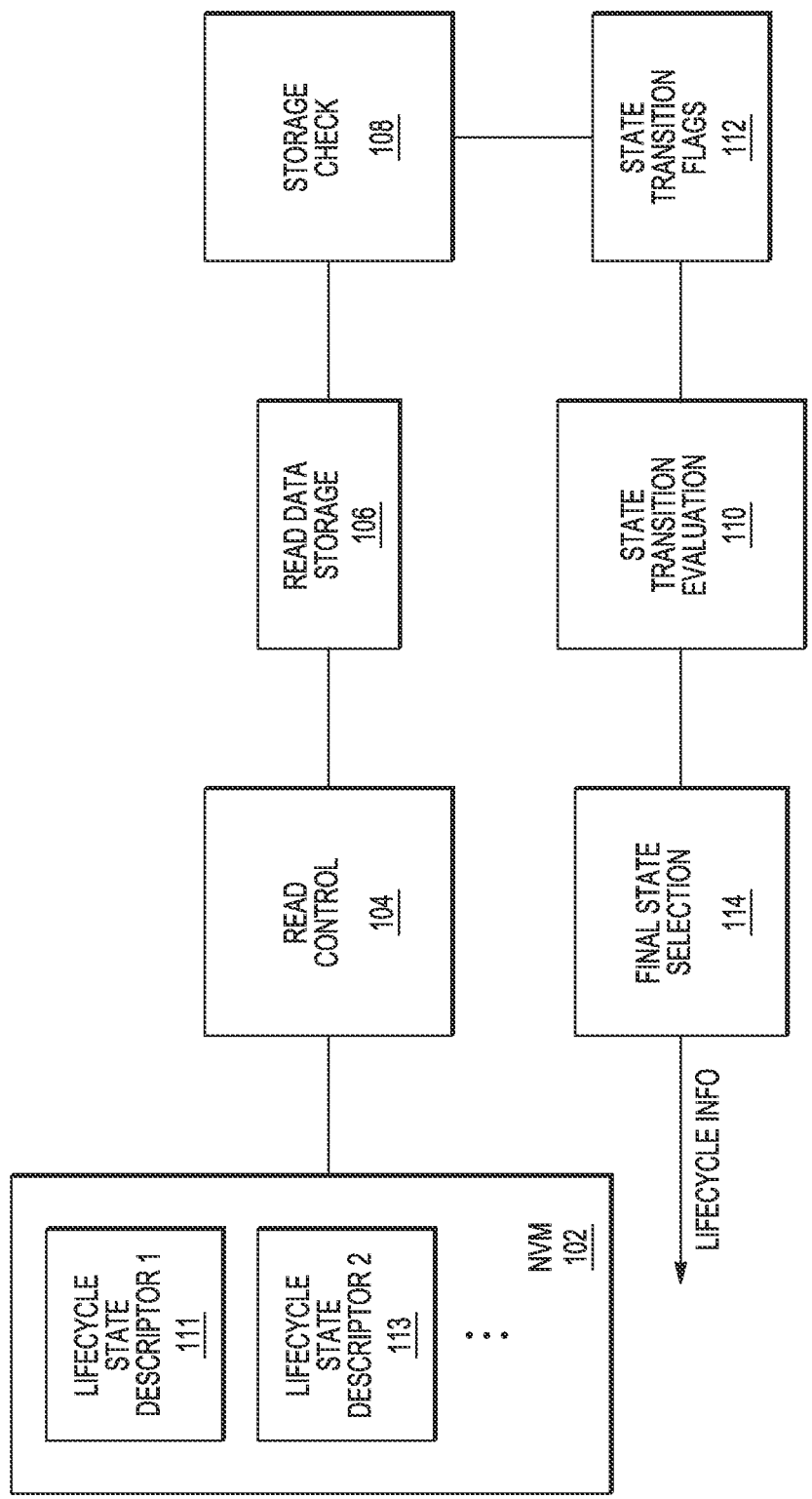
FIG. 1 is a block diagram of an IC having a security module employing overlapping and redundant security operations for accessing stored lifecycle information in accordance with at least one embodiment of the present invention.

FIGS. 1-6 illustrate techniques for accessing stored lifecycle (LC) information within an IC using overlapping stages with redundant operations and cross-checking capabilities to protect the LC information from unauthorized alteration during an access sequence. The IC includes a security module with multiple stages arranged in a pipeline, with each stage executing a different operation for accessing the stored LC information. For each portion of LC information (that is, the information defining a LC "state") being accessed, each stage performs N iterations of its corresponding operation, whereby N is an integer greater than two, and crosschecks the results of successive iterations to ensure that the results of the operation are consistent. In addition, the stages of the security module are overlapping, such that different stages can perform different iterations concurrently. These concurrent operations at different stages are organized such that they may also be crosschecked and thereby confirm "offset" results between the stages. For example, while one stage is executing its Nth iteration, the following stage can be executing its (N−1)th iteration, and the results of the operations are cross-checked to identify any discrepancies that would indicate an unauthorized alteration of the LC information. By employing both redundant iterations at each stage, and overlapping the stages with cross-checking to provide for confirmation of offset results, the security module provides enhanced security for the LC information, and for the security features supported by the LC information. Further, the results of every redundant iteration are separately stored and are transferred only to the subsequent iteration of the following stage, thus avoiding "cross-pollution" of a compromised result within an earlier stage.

To illustrate via an example, the security module can include a read stage to read LC information from a memory and a storage check stage to check whether the read LC information has been properly stored within a storage device (e.g., a register implemented by one or multiple flip-flops). The read stage is configured to read each unit of LC information three separate times (that is, the number of iterations N of the read stage is 3), and crosscheck the results of each iteration after the first with the previous iteration. That is, the results of the second read operation are crosschecked with the results of the first, and the results of the third read operation are crosschecked with the results of the second. The storage check stage is configured to check each stored result of an iteration of the read stage, so that the storage check stage also has three iterations. The iterations of the storage check stage overlap with the iterations of the read stage, so that the first iteration and the second iteration of the storage check stage are executed concurrently with the second and third iterations, respectively, of the read stage. Further, the results of the second iteration of the storage check stage is cross-checked against the results of the third iteration of the read stage to confirm both operations. Thus, the results of each stage are internally crosschecked between iterations of the stage, and results between overlapping iterations of the stages are also crosschecked. Additionally, every iteration operates on different, redundant data that is stored separately so that the iterations are independent of each other. In response to a crosscheck (either internally or between stages) indicating a discrepancy in results, the security module indicates an error and prevents access to the LC information, thereby preventing accesses to protected information or functionality of the IC.

Using the techniques described herein, the security module protects the LC information against a diverse range of breach techniques. For example, the internal crosschecks of a stage provide for temporal diversity, and therefore provide protection against breach techniques that attack a single iteration of the stage. Further, the crosschecks between overlapping iterations of the different stages provide protection against breach techniques that modify or prevent the modification of a processing step within a single iteration or a single stage of the security module. The security module can provide further protection for the LC information via the hardware configuration of the module, such as via the use of dual rail encoding for transferring data, use of hardwired security confirmation values, inverting data for selected iterations of selected stages, and the like.

FIG. 1 illustrates a security module 100 included in an IC in accordance with at least one embodiment of the present invention. For purposes of description, it is assumed that the IC is a system-on-a-chip (SoC), usually containing at least one microprocessor that executes instructions, organized in the form of one or more computer programs, to perform designated tasks on behalf of an electronic device such as a personal computer, server, tablet, smartphone, automobile, and the like.

The security module 100 is generally configured to read LC information from a persistent storage 102. The persistent storage 102 can be any type of non-volatile memory (NVM), such as flash memory, read only memory (ROM), one-time programmable (OTP) fuses, and the like, or a combination thereof. In the embodiment of FIG. 1, it is assumed that the persistent storage 102 is implemented in form of a non-volatile flash memory and is therefore referred to as NVM 102. The NVM 102 stores the LC information as a set of LC state descriptors (e.g., LC state descriptors 111 and 113). In at least one embodiment, each LC state descriptor is a digital value of one or more bits that is stored within the NVM 102 as the IC is moved from one stage of manufacture and production to the next. For example, the LC state descriptor 111 can be stored within the NVM 102 when the IC is transferred from one stage (e.g. the initial manufacturing stage) to another stage (e.g. after IC testing, or after a production stage where the IC is embedded in a printed circuit board or other device for sale to an outside engineering manufacturer (OEM)) of manufacture and production). The LC state descriptor 113 is stored within the NVM 102 when the IC is transferred to yet another stage of manufacture and production, such as when the IC is transferred from the OEM to a retailer for sale to an end user. The LC state described by such descriptors stored within the NVM 102 indicates the current stage of the IC in its manufacture and production lifecycle.

To provide security for the LC information, the values of the LC state descriptors are governed by an LC security protocol, whereby the value of each LC state descriptor must follow the LC security protocol in order to indicate a valid LC state description for the IC. The LC security protocol can define specific values for each LC state descriptor, or can define transitions between successive LC states without defining the specific values for each state descriptor. For example, the LC security protocol can define permitted differences between values of successive LC state descriptors without defining the particular value for any one of the successive LC state descriptors. As described further herein, the security module 100 is generally configured to perform at least two security operations for the IC: 1) detection of potential tampering with the LC state descriptors as the descriptors are being accessed at the NVM 102; and 2) evaluation of the LC state descriptors to ensure that the descriptors collectively follow the LC security protocol, while calculating the LC state from the evaluation of these descriptors. If the security module does not identify any error based on either of these two security operations, the security module 100 provides the calculated LC state to another module of the IC (not shown), such as a module that governs access to secured information or functionality of the IC based on the actual LC state. However, in response to identifying an error based on either of these two security operations, the security module 100, or another module of the IC, prevents access to the LC information while indicating invalid LC information, thereby ordering the IC to protect the secured information or functionality from unauthorized access.

To support these security operations, the security module 100 includes a read control module 104, read data storage 106, a storage check module 108, a state transition evaluation (STM) module 110, LC state transition flags 112, and a final state selection (FSS) module 114. In at least one embodiment, in addition to the connections between these modules illustrated at FIG. 1, the read control module 104 and storage check module 108 are each connected to the FSS module 114 to provide error signals. These connections are not illustrated at FIG. 1 for figure clarity.

To summarize the operation of each module, the read control module 104 is generally configured to read LC state descriptors from the NVM 102 and store it at the read data storage 106 for further analysis. The read data storage 106 can be a register or other storage device such as a portion of a volatile memory (e.g., random access memory (RAM)). The storage check module 108 is configured to review the data stored within the read data storage 106 to ensure that the LC state descriptors read from the NVM have been properly stored (e.g., have not been tampered after reading from the NVM 102 or when storing in the read data storage 106).

The state transition evaluation module 110 is configured to analyze the LC state descriptors stored within the read data storage 106 to ensure that their content, format, and encoding comply with the LC security protocol. Based on its analysis, the state transition evaluation module determines state transition flags 112, which are employed by the FSS module 114 to determine valid LC state transitions and also identify any errors in these flags. In particular, the combination of the STM module 110 and the LC state FSM 114 applies at least three different checks on the state transition flags 112, including an LC FSM check to ensure that the redundant FSMs are both operating properly and have matching results, an LC valid check to ensure that the transitions between LC states comply with the LC security protocol, and an LC series check, to ensure that a complete sequence of LC state indicators is processed.

Figure 2:
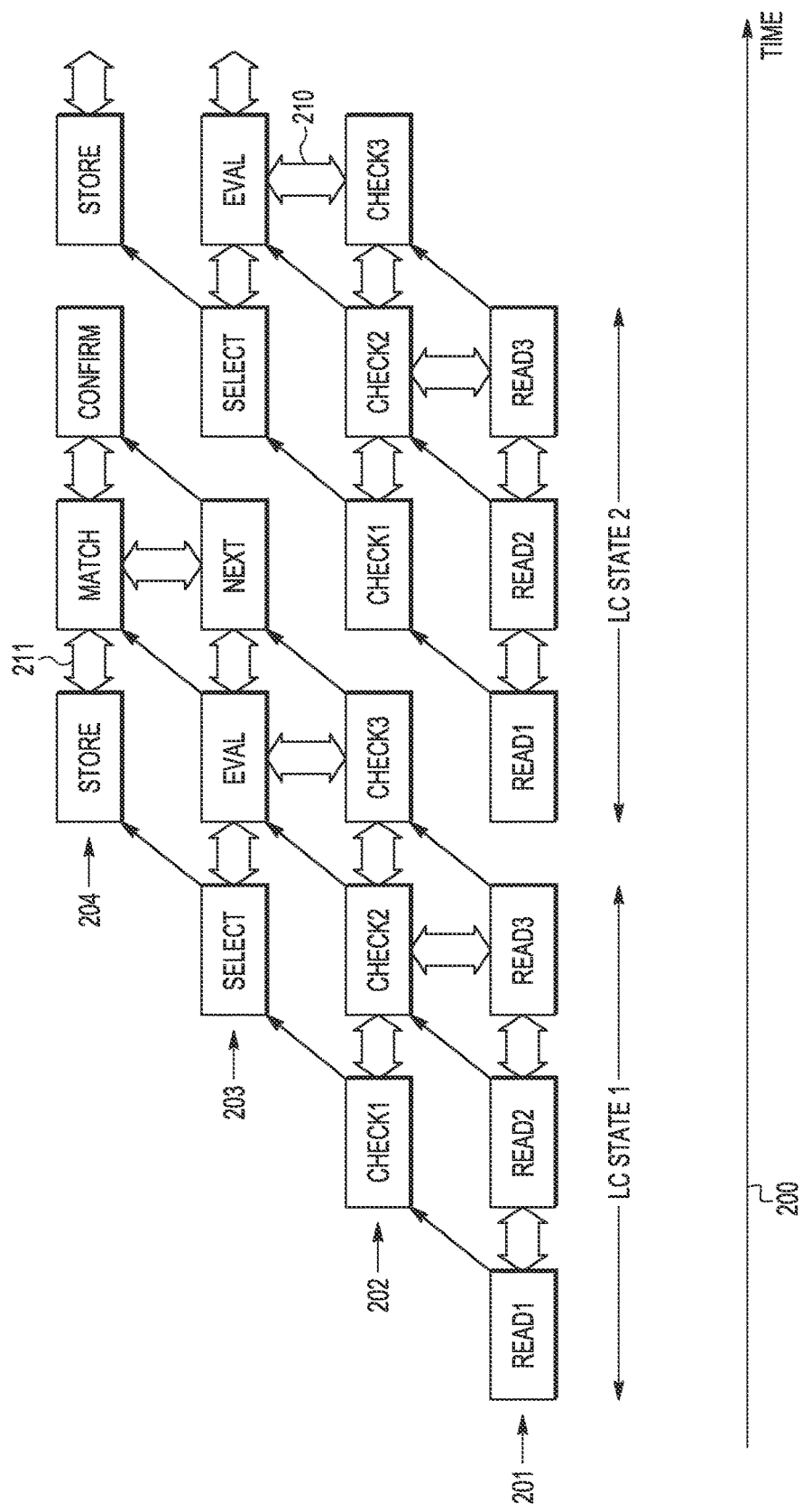
FIG. 2 is a diagram illustrating an example of the overlapping and redundant security operations for accessing stored lifecycle information at the security module of FIG. 1 in accordance with at least one embodiment of the present invention.

An example of the security operations performed by the security module 100 can be understood with reference to FIG. 2, which illustrates a portion of a timeline 200 in accordance with at least one embodiment of the present invention, depicting the operations associated with two LC states (for the second LC state not all operations are shown in this timeline, also there might be more LC states implemented). The timeline 200 depicts the timing of different operations at different stages of processing security module 100. In particular, row 201 represents operations of the read control module 104, row 202 represents operations of the storage check module 108, row 203 represents operations of the state transition evaluation module 110, and row 204 represents operations of the FSS module 114. In the depicted example, each of the stages performs three operations for each LC state. For some stages, such as the read control module 104, the operations are equivalent (that is, the stage performs a similar operation three times). For other stages, such as the state transition evaluation module 110, the operations may differ and the results of one operation are not only cross-checked but also employed by the subsequent operation, with a result of the stage being provided by the third operation of the stage.

The example of FIG. 2 further depicts two kinds of crosschecks: 1) intra-stage crosschecks indicated by horizontal bi-directional arrows (e.g., arrow 211) and representing checks between the different operations of a stage; and 2) inter-stage crosschecks, indicated by vertical bi-directional arrows (e.g., arrow 210) and representing checks between the operations of different stages. The diagonal arrows depict the flow of information between the stages, showing the creation and consuming of data; e.g. the information created by the operation READ1 is consumed by the operation CHECK1, the information created by the operation READ2 is consumed by the operation CHECK2, etc. The operations in the same column at the different stages are performed concurrently, and are timed so that the inter-stage crosschecks are performed in an overlapping fashion, so that the second operation of one stage is crosschecked with the results of the third operation of the previous stage. By using both intra-stage crosschecks and overlapping inter-stage crosschecks, the security module 100 provides for enhanced protection of the LC information while reading from the NVM 102. For example, the intra-stage crosschecks prevent any attempt to breach a given stage of the security module 100 that is not maintained across the different operations of the stage, which is difficult for many common breach techniques. Further, the overlapping intra-stage crosschecks prevent many breach attempts that target only a single stage of the security module 100 and breach techniques that target multiple stages of the security module 100 are likely to be prohibitively expensive or complex; especially when these are concurrently checked by repeated, redundant operations.

Referring to the individual rows of the timeline 200, row 201 depicts operations of the read control module 104. In the illustrated example, the read control module performs three separate and independent reads of an LC state descriptor from the NVM 102, and crosschecks the results by comparing the result of every read to the results of the previous read, so that the results of READ2 are compared to the results of READ1, and the results of READ3 are compared to the results of READ2. If any of these comparisons indicates a mismatch, the read control module 104 can indicate an error, causing the security module 100 to indicate invalid LC information to the system. Otherwise, the read control module 104 stores the result of each read within the read data storage 106.

Row 202 depicts operations of the storage check module 108. For each LC state, the storage check module 108 performs three checks of the data stored within the read data storage 106. In at least one embodiment, every check compares the information extracted from a LC state descriptor and stored within the read data storage 106 against one or more predefined markers denoting a valid entry or exit into the corresponding lifecycle phase according to the LC security protocol. For example, for each LC state, the markers may indicate a value or set of values expected at a particular bit position or positions, of the LC state descriptor information. The results of the comparison are stored in a corresponding flag. The storage check module 108 crosschecks the flag stored by an operation with the flag stored by the previous operation. In the event of a mismatch, the storage check module 108 indicates an error to the security module 100. In addition, during its second operation, the storage check module 108 crosschecks the data generated and written by its first operation (CHECK1) against the data provided by the final operation of the previous stage (READ3) to ensure the data it recorded corresponds to the data it actually received; in the event of a mismatch, indicates an error to the security module 100.

Row 203 corresponds to operations of the state transition evaluation module (STM) 110. As described further below with respect to FIG. 5, in at least one embodiment the STM module 110 is generally configured to employ a pair of redundantly operating finite state machines (FSMs). These FSMs are responsible to process the sequence of individual LC state descriptors read from the NVM 102, converted into state transition flags 112. It verifies the correct individual encoding, as well as their sequence according to the security protocol associated with the security module 100. Each of the FSMs is configured to read a different subset of the flags stored by the storage check module 108 and transition to a next state based on the value of the read flags.

To support these functions, for each LC state the STM module 110 performs three different operations as illustrated by row 203: a select operation, followed by an evaluate operation, followed by a next state operation. During the select operation, the one flag for each FSM of the STM module 110 is selected and the corresponding next state of the FSM is identified. During the evaluate operation, another flag for each FSM is selected and the corresponding next state for the FSM is identified. In the next state operation, the two identified next states of the FSM are compared and, in the event of a match, the FSM transitions to the matching, selected next state. In the event of a mismatch, resulting from mismatched flags and therefore indicating a potential tampering with the LC information, the STM module 110 indicates an error. In addition, in the illustrated example, during the evaluation operation the STM module 110 crosschecks the results of the first (SELECT) operation (based on the stored flag), a matching result of the evaluation operation, with the data provided by the third check operation (CHECK3) of the storage check module 108 and, in the event of a mismatch, indicates an error.

Row 204 also corresponds to additional operations of the state transition evaluation module (STM) 110, which is further configured to identify mismatches and errors in the states, or state transitions, of the two redundant FSMs processing the LC state descriptors. As illustrated, for each read of an LC state descriptor from the NVM 102, the STM module 110 performs three different operations in this stage: a store operation, a match operation, and a confirm operation. The operations in this stage reflect the mutual cross checking of the two redundantly operating FSMs, which are only transitioning to a valid next state when the next state determined by every FSM individually matches the next state of the other FSM. This cross-checking may be performed by an independent, separate submodule, or folded within the operation of the FSM itself. During the store operation, the STM module 110 records any mismatches in the current state of the FSMs. During the match operation, the STM module 110 records any mismatches in the evaluation of the flags by each of the FSMs. During the confirm operation, the STM module 110 identifies any mismatches in the next state of the FSMs based on the evaluated flags. If any mismatches are recorded, the STM module 110 indicates an error and in response the security module 100 prevents access to the LC information.

Figure 3:
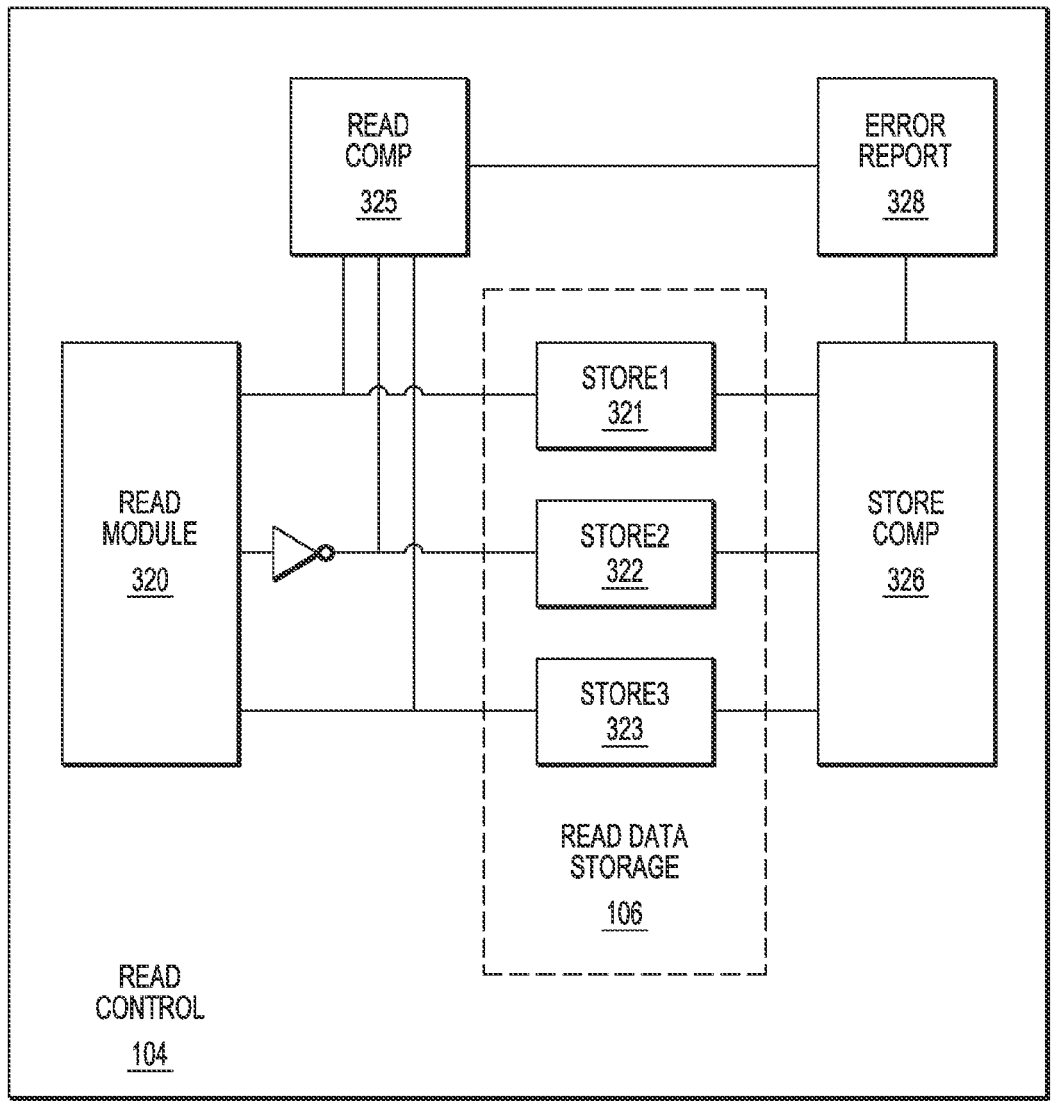
FIG. 3 is a block diagram of a read control module of the IC of FIG. 1 in accordance with at least one embodiment of the present invention.

FIG. 3 illustrates a block diagram of the read control module 104 in accordance with one embodiment of the present invention. The read control module includes a read module 320, storage modules 321-323, a read compare module 325, a store compare module 326, and an error report module 328. The read module 320 includes circuitry to perform three read operations of each LC state descriptor from the NVM 102 and store the results of the read operation at a different one of the storage modules 321-323. In the illustrated embodiment, the data of the second read operation is inverted prior to being stored. This inversion thereby provides further protection against at attempted breach because such an attempted breach is unlikely to mimic the effects of the inversion for the second read operation.

In at least one embodiment, each read operation occurs during a separate clock cycle, referred to for purposes of description as Beat1 (corresponding to READ1, the first read operation), Beat2 (corresponding to READ2, the second read operation), and Beat3 (corresponding to READ3, the third read operation). The read compare module 325 is configured to compare read data, as it is being read to the stored results of the previous read within the storage modules 321 to 323. Thus, during Beat2 the read compare module 325 compares the READ2 data to the data stored in storage module 321 (the stored READ1 data), taking into account the inversion of the READ2 data. Similarly, during Beat3 the read compare module 325 compares the READ3 data to the data stored in storage module 322 (the stored READ2 data) taking into account the inversion of the Read2 data. For both compare operations, the read compare module 325 indicates a mismatch (which indicates a potential breach) to the error report module 328.

The store compare module 326 performs compare operations similar to those of the read compare module 325, but instead of comparing data as it is being read the store compare module 326 compares the data after it has been stored within the storage modules 321-323. Accordingly, after Beat2 the store compare module 326 compares the data in the storage module 322 (the stored READ2 data) to the data stored at storage module 321 (the stored Read1 data), taking into account the inversion of the READ2 data. Similarly, after Beat3 the store compare module 326 compares the data stored in the storage module 323 (the stored READ3 data) to the data stored at storage module 322 (the stored Read2 data) taking into account the inversion of the READ2 data. For both compare operations, the store compare module 326 indicates a mismatch (which indicates a potential breach) to the error report module 328.

The error report module 328 is configured to receive indications of mismatches in read or stored data from the read compare module 326 and the store compare module 326, respectively. Such mismatches indicate potential attempts to breach LC state data as it is being read from the NVM 102 and written into the storage modules 321 to 323. Accordingly, in response to receiving an indication of a mismatch, the error report module 328 sets an error flag or otherwise indicates an error to the security module 100. In response to the error indication, the security module 100 prevents access to the LC state while indicating an invalid LC information, thereby ordering the IC to protect the secured information or functionality from unauthorized access.

In at least one embodiment, the read control module 104 employs dual rail encoding to communicate data, including both the read data and the results of crosschecks of the read data. In particular, to communicate the state of a given bit of information, the read control module 104 employs two rails, with a "1" value of the bit indicated by asserting a signal on one of the two rails, and a "0" being indicated by asserting a signal on the other of the two rails. By employing dual rail encoding, the read control module 104 further protects the integrity of the LC information access, as it is difficult for attacks to mimic dual rail encoding. Dual rail encoding may also be employed by one or more of the other modules described herein.

Figure 4:
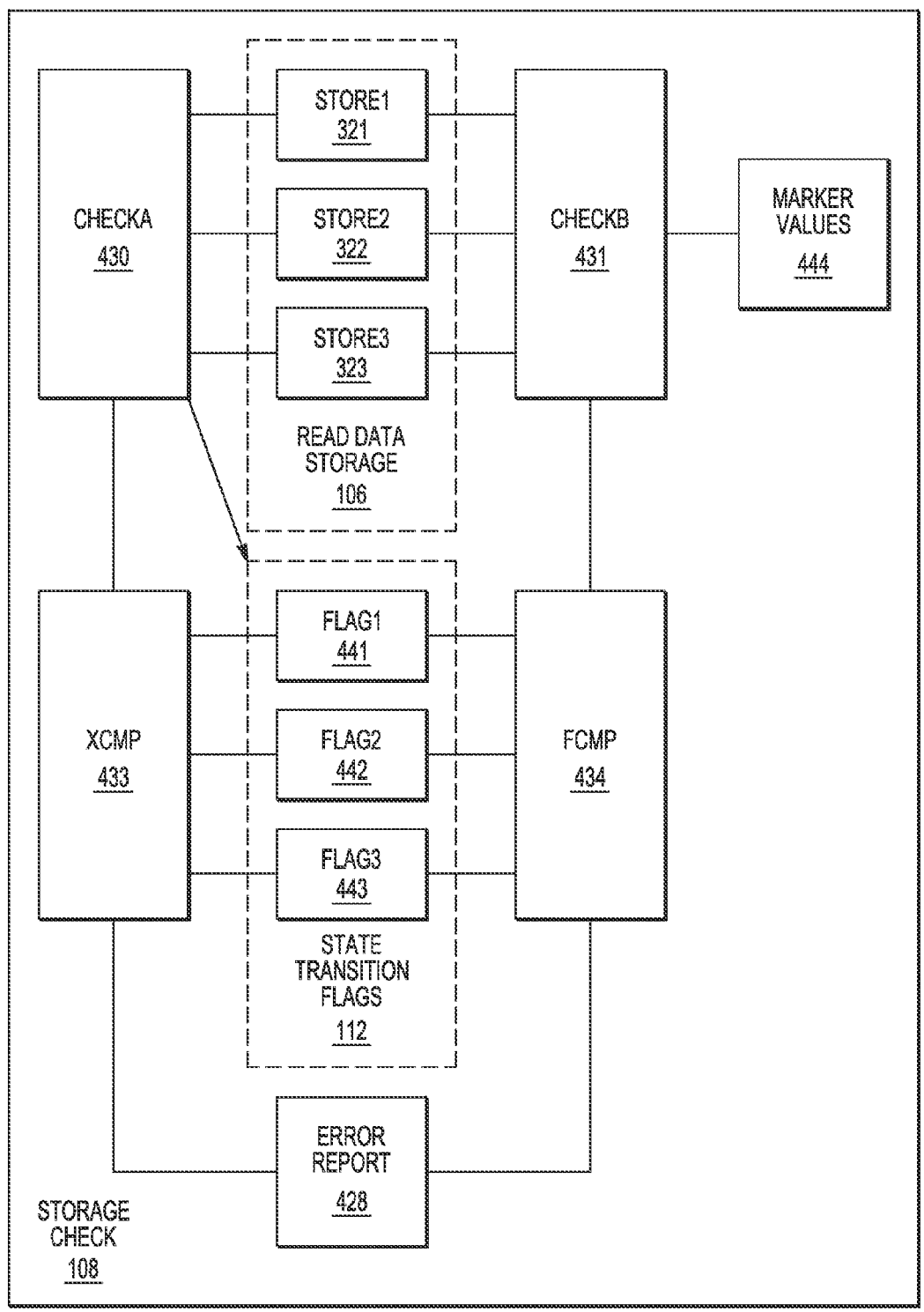
FIG. 4 is a block diagram of a storage check module of the IC of FIG. 1 in accordance with at least one embodiment of the present invention.

FIG. 4 illustrates a block diagram of the storage check module 108 in accordance with at least one embodiment of the present invention. In the depicted example, the storage check module includes error report module 428, marker check modules 430 and 431 (designated CHECKA and CHECKB, respectively), flag compare modules 433 and 434 (designated XCMP and FCMP, respectively), and flag storage modules 441-443. The marker check module 430 includes combinatorial logic to generate flag values based on stored read data, wherein the combinatorial logic is arranged to implement portions of a defined security protocol for the security module 100. Thus, the combinatorial logic is arranged so that a generated flag value will have an expected value, as defined by the security protocol, when an expected LC state descriptor (as defined by the security protocol) is applied to the combinatorial logic. The marker check module 430 is configured to perform three separate applications of read data, each application corresponding to a different one of the read data stored at the storage modules 321-323 (illustrated at FIG. 4 for clarity), and generating a separate flag value that is stored at a different one of the flag storage modules 441-443. Thus, for example, during a first beat (corresponding to a clock cycle of an applied clock signal), the marker check module 430 generates a flag value based on the read data at the storage module 321 and stores the flag value in the flag storage module 441. During the following beat, the marker check module 430 generates a flag value based on the read data at the storage module 322 (taking into account the inversion of its value) and stores the flag value in the flag storage module 442, and during a third beat performs a similar operation, using the read data at the storage module 323, to generate a flag value stored in the flag storage module 443. In the illustrated embodiment, the data of the second read operation is inverted prior to being stored, also the generated flag value in storage module 442 is inverted. This inversion thereby providing further protection against at attempted breach because such an attempted breach is unlikely to mimic the effects of the inversion for the second flag generation operation.

The flag compare module 433 is configured to compare the values of the generated flags after they are stored at the flag storage modules 441-443 and, in response to detecting a mismatch provides an error indication to the error report module 428. In at least one embodiment, the flag compare module 433 compares the flag values in successive beats. For example, during one beat the flag compare module compares the flag value stored at the flag storage module 441 with the flag value stored at the flag storage module 442 (taking into account the inversion of its value). During the following beat the flag compare module compares the flag value stored at the flag storage module 442 (taking into account the inversion of its value) with the flag value stored at the flag storage module 443. The flag compare module 433 thus performs its comparisons as new flag values are generated and stored, improving efficiency of the security module 100.

Concurrent with the operations of the marker check module 430, the marker check module 431 compares the read values stored in the storage modules 321-323 with hardwired marker values 444. Usage of hardwired marker values is beneficial to protect against attack scenarios that are using modifications of power supply to have an equivalent impact on all flip-flops storing a LC state descriptor and an expected valid value, which might be used to cause false comparison results. The marker values 444 represent portions of the LC state descriptors that are required by the security protocol implemented by the security module 100. For example, the security protocol may require that a specified portion of each LC state descriptor have a specified value, and this specified portion and value is reflected in the marker values 444. In cases where in the illustrated embodiment, the data of the read operation is inverted prior to being stored, also the corresponding marker value 444 is inverted. The marker check module 431 compares the marker values to the read values stored in the storage modules 321-323 and, based on the comparison generates a check value. The marker check module 431 generates the check value such that, if the read value matches the marker values 444, the check value matches the expected value of the flags generated by the marker check module 430.

The flag compare module 434 compares the check values generated by the marker check module 431 to a corresponding one of the flag values stored at the flag storage modules 441-443. For example, during one beat the flag compare module 434 compares the check value generated based on the read value at the read storage module 321 with the flag stored at the flag storage module 441. During the following beat, the flag compare module 434 compares the check value generated based on the read value at the read storage module 322 with the flag stored at the flag storage module 442. In the event of a mismatch, the flag compare module 434 indicates a mismatch to the error report module 428; thus also verifying the correct storage of the determined flag values.

The error report module 428 is configured to receive indications of mismatches between flags or between a flag and a corresponding check value from the flag compare modules 433 and 434, respectively. Such mismatches indicate changes in read values or flag values during or between operations, and therefore indicate potential attempts to breach LC state data as it is being checked. Accordingly, in response to receiving an indication of a mismatch, the error report module 428 sets an error flag or otherwise indicates an error to the security module 100. In response to the error indication, the security module 100 prevents access to the LC state while indicating an invalid LC information, thereby ordering the IC to protect the secured information or functionality from unauthorized access.

Figure 5:
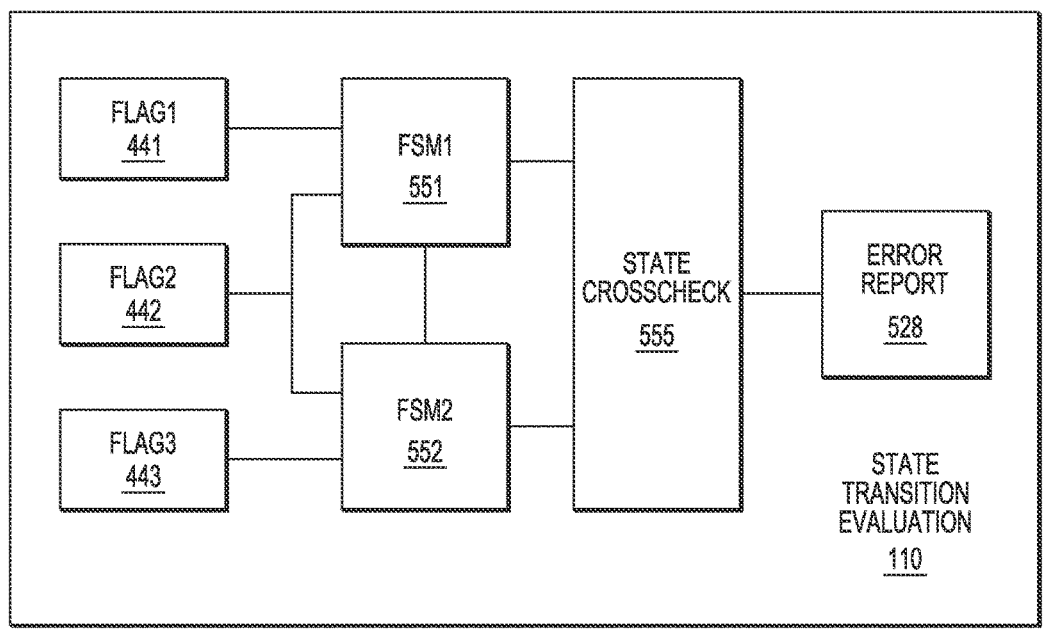
FIG. 5 is a block diagram of a state transition evaluation module of the IC of FIG. 1 in accordance with at least one embodiment of the present invention.

FIG. 5 illustrates a block diagram of the STM module 110 in accordance with at least one embodiment of the present invention. In the depicted example, the STM module 110 includes two state machines, FSM 551 and FSM 552. The FSMs 551 and 552 are redundant, such that if each is initialized to the same initial state, and the same sequence of inputs is applied to each, then each FSM will arrive at the same state. The STM module 110 uses this redundant aspect to provide a further check on the flag values stored at the flag storage modules 441-443. In particular, the STM module 110 uses the FSMs 551 and 552 to perform two different checks: 1) whether two different flags in the flag storage module 441-443 will cause the corresponding FSM to perform a valid transition to the same next state; and 2) whether the set of flags in the flag storage module 441-443 will cause the independent processing by the FSMs 551 and 552 to each arrive at the same state. An invalid transition or a mismatch in either case indicates that one or more of the different flags were not generated properly and consistently, or were not consistently and correctly processed by the FSMs 551 and 552. A mismatch therefore indicates a potential breach of the LC information processing.

Processing of the flag sets by the two FSMs may occur concurrently or by the first FSM performing its operations and the second FSM performing its corresponding operations in the following beat. The lagged operation by the second FSM provides the benefit of time diversity, where no single time step exists when the same operation is performed by both FSMs. The independent processing of the information derived from a LC state descriptor performed by each FSM in accordance with at least one embodiment of the present invention consists of the following three operations: during a first SELECT operation, the FSM selects a first flag set from a corresponding pair of the flag storage modules 441-443 and determines its next state based on the selected flag set. This next state is recorded in a first temporary storage. During the following EVAL operation the FSM selects a different flag set from a corresponding pair of the flag storage modules 441-443 and determines its next state based on the selected flag set. This next state is also recorded in a second temporary storage. During the following NEXT operation, the FSM compares the content of both temporary storages, and, if the states match the FSM enters the corresponding state. A mismatch in the stored states indicates an error in the processing or a different flag value was applied to the FSM during the SELECT and EVAL phases, and therefore a potential breach. Accordingly, the FSM indicates the mismatch to an error report module 528. In addition, the next state may be identified by the FSM as an error in response to determining that the information in the selected flag set does not adhere to the LC security protocol. In accordance with at least one embodiment of the present invention the selected flag sets for each FSM may differ. The first FSM 551 may select a first flag set from the flag storage module 441 and a second flag set form the flag storage module 442, while the second FSM 552 may select a first flag set form the flag storage module 441 and a second flag set form the flag storage module 443. Other embodiments may employ different sets of flags.

To support further cross-checks, the STM module 110 includes a state crosscheck module 555. The state crosscheck module 555 performs checks on the calculation result of both FSMs 551 and 552, where in accordance with at least one embodiment of the present invention the calculation of the FSM 552 may be lagging one beat or operation relative to the FSM 551. Consequently the checks by the state crosscheck module are comparing the calculation result of the previous beat for the FSM 551 with the calculation result of the current beat for the FSM 552. During a first operation (STORE) the state crosscheck module records match information determined from the corresponding SELECT operation of both FSMs 551 and 552, during a second operation (MATCH) the state crosscheck module records match information determined from the corresponding EVAL operation of both FSMs 551 and 552, during the third and final operation (CONFIRM) the information from the two previous operations is compared. Any mismatch between the corresponding results of the FSMs 551 and 552, or between the result of the STORE and MATCH operation indicates differences in the processing between the FSMs 551 and 552, and therefore indicates a potential breach of LC information. Accordingly, the crosscheck module 555 reports a mismatch to the error report module 528. In another embodiment of the present invention the operation of the state crosscheck module may be folded into the FSMs 551 and 552, thus combining the operations of the state crosscheck module 555 with the operations of these FSMs.

The error report module 528 is configured to receive indications of mismatches between the states of the FSMs 551 and 552 or mismatches between next states of an individual one of the FSMs 551 and 552 based on different flag values, as well as indications of incorrect state transitions according to the LC security protocol. Such error conditions indicate an incorrect processing or changes in flag values during or between operations, and therefore indicate potential attempts to breach LC state data or its processing. Accordingly, in response to receiving an indication of a mismatch, the error report module 528 sets an error flag or otherwise indicates an error to the security module 100. In response to the error indication, the security module 100 prevents access to the LC state, while indicating an invalid LC information, thereby ordering the IC to protect the secured information or functionality from unauthorized access.

Figure 6:
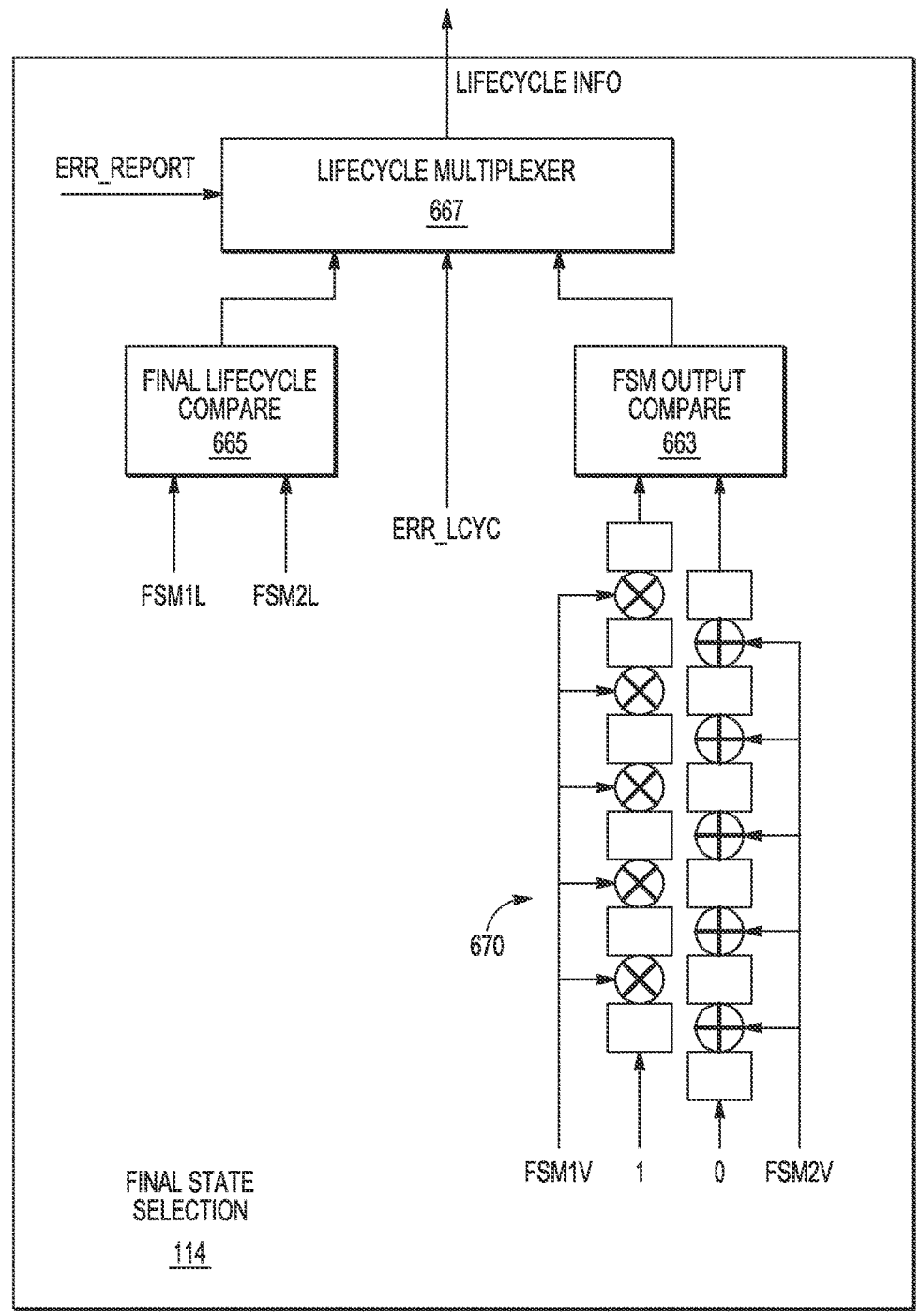
FIG. 6 is a block diagram of a lifecycle state finite state machine of the IC of FIG. 1 in accordance with at least one embodiment of the present invention.

FIG. 6 illustrates a block diagram of the FSS module 114 in accordance with at least one embodiment of the present invention. In the illustrated example, the FSS module 114 includes a final lifecycle compare module 665, an FSM output compare module 663, an LC multiplexer 667, and a dual-rail encoded shift register (DSR) 670. The DSR 670 is configured to shift two hardwired values (depicted as a "1" and a "0") based on the valid outputs of the FSMs 551 and 552; FSM1V for FSM551 and FSM2V for FSM2 respectively. In particular, the FSMs 551 and 552 are each configured to output a valid indication at these outputs in response to the read LC state being properly encoded and processed. In accordance with at least one embodiment of the present invention, a valid state is signaled by providing a '1' at the output FSM1V, while a valid state is signaled by providing a '0' at the output FSM2V; such inverse encoding is equivalent to a dual rail encoding and is useful to prevent security attacks. Further, the DSR 670 includes a number of shift locations corresponding to the number of LC state descriptors that must be evaluated to completely process the LC state information. The default value for any flip-flop in this shift register is either all 0 or all 1, resulting in an invalid dual-rail encoded equivalent output, until a sufficient number of shift operations have taken place. The output of every flip-flop of the DSR is combined with its corresponding valid output from one of the two FSMs; the flip-flops shifting a valid '1' are combined with the FSM1V signaling a valid state by a '1' over an AND gate, while the flip-flops shifting a valid '0' are combined with FSM2V signaling a valid state by a '0' over an OR gate. Accordingly, if each read LC state has been properly encoded, the FSMs 551 and 552 will each output a series of valid output values, wherein the number in the series is equivalent to the number of LC state descriptors. Thus, only a complete series of valid state indications will, result in the DSR 670 shifting the two hardwired values, 1 and 0, to the FSM output compare module 663. Any incomplete processing will cause an incorrect dual rail encoding (resulting from the reset value of the flip-flops implementing the DSR) to output to the FSM output compare module 663. Also, any incorrect state transition or any mismatch in the encoding will be signaled by at least one of the two valid signals FSM1V and FSM2V, thereby causing the DSR to modify the two hardwired values being shifted and also providing an incorrect signature to the FSM output compare module 663.

The FSM output compare module 663 compares the outputs of the DSR 670 to be the expected hardwired, dual-rail encoded signature 1 from FSM1 and 0 from FSM2. In response to those output values matching the corresponding hardwired value, the FSM output compare module 663 asserts a 1 at its output. In response to either output of the DSR 670 not matching its corresponding hardwired value, the output compare module outputs a 0 at its output. Thus, based on the operation of the DSR 670 the FSM output compare module asserts a 1 at its output only if 1) the proper number of LC states, as indicated by the number of shift locations of the DSR 670, have been processed by the FSM 551 and 552; and 2) each LC state information has been indicated as properly encoded by each of the FSMs 551 and 552 in accordance with the LC security protocol.

The final lifecycle compare module 665 compares the LC state outputs of the FSMs 551 and 552 (FSM1L and FSM2L), providing the final LC state value determined from the LC state descriptors read from the NVM 102. For any information related to a LC state descriptor both FSMs 551 and 552 output a corresponding state value, corresponding to the next state determined and stored during the NEXT operation. In accordance with at least one embodiment of the present invention this LC state value may either correspond to a valid LC state or an error state for every FSM. In accordance with another embodiment of the present invention this LC state value may always correspond to a valid LC state; in case of such an embodiment errors identified during the processing are collected by the error report module 528. In both cases mismatches between the final LC state value provided by the LC state outputs of the FSM551 and 552 are handled as error conditions equivalent to error conditions reported by the other error report modules 328, 428, and 528.

The LC multiplexer 667 is configured to select between two inputs: a hardwired value designated as ERR CYC, and the output of the final lifecycle compare module 665. The LC multiplexer 667 makes the selection based on the value output by the FSM output compare module 663 in combination with other error conditions provided by the error report modules 328, 428, and 528 (as indicated by the illustrated signal ERR REPORT) as well as the comparison result of the final lifecycle compare module 665. In particular, only when the output of the FSM output compare module 663 is indicating that all lifecycle states have been processed, and that none of these processing operations has caused an error at one or both of the FSMs 551 and 552, that the final LC states calculated match as indicated by the final lifecycle compare module 665, and also that there was no error condition reported by an earlier operation (as indicated by one or more of the error report modules 328, 428, and 528), the LC multiplexer 667 selects the output of one of the two FSMs 551 or 552 (because both match, either can be used). In all other cases the LC multiplexer 667 selects the ERR CYC input, indicating an error condition. The LC multiplexer 667 provides the selected output as an error indication signal, designated "LIFECYCLE ERROR". The security module 100 uses the LIFECYCLE ERROR signal to indicate that invalid LC information has been detected. In response, another module of the IC (not shown) may protect the secured information or functionality from unauthorized access. For example, in at least one embodiment, this module may prohibit further operation or only provide limited capabilities of the IC when there is no "LIFECYCLE ERROR" indicated. Therefore, access is only permitted in accordance to the determined lifecycle state when all LC state descriptors have been read from the NVM 102, their processing has not caused an error, and the outputs of the FSMs 551 and 552 for the final lifecycle state match.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of reading lifecycle (LC) information at an integrated circuit, comprising:
for each of a plurality of lifecycle state descriptors of the LC information, wherein the LC information indicates a stage of manufacture or production of the integrated circuit (IC):
accessing the lifecycle state descriptor at a persistent storage module;
for each of a plurality of security stages determining a lifecycle state transition of a security module of the IC by:
executing at least three iterations of a corresponding security operation based on the lifecycle state descriptor;
crosschecking results of the at least three iterations and reporting an error in response to the crosschecking identifying a mismatch in the results;
determining a validity of a portion of the lifecycle state transition assigned to the stage corresponding to the lifecycle state descriptor by combining results of the at least three iterations; and
verifying the lifecycle state transition by verifying an output of the security stage; and
in response to at least one of the plurality of security stages indicating an error, identifying the LC information as invalid for the integrated circuit.

2. The method of claim 1, wherein executing the at least three iterations of the corresponding security operation comprises independently executing each of the at least three iterations of the corresponding security operation based on independently stored redundant input data.

3. The method of claim 2, wherein at least one of the independently stored redundant input data is inverted for processing by the corresponding security operation.

4. The method of claim 2, wherein a result of one of the at least three iterations is provided as input to a subsequent iteration of a subsequent security stage.

5. The method of claim 1, wherein a result of a first iteration of a first security stage is cross-checked with input data of a concurrent iteration of a subsequent security stage of the plurality of security stages.

6. The method of claim 1, wherein at least one of the plurality of security stages comprises at least two redundantly operating finite state machines (FSMs) and further comprising:
verifying operation of any of the at least two FSMs; and
cross checking operation of the at least two FSMs.

7. The method of claim 6, wherein verifying operation of any of the at least two FSMs comprises:
determining a first state transition by at least one FSM based on a first set of inputs comprising results of at least two iterations of a previous security stage; and
determining a second state transition of the at least one FSM based on a second set of inputs comprising results of at least two different iterations of a security operation of the previous security stage;

where a valid state transition by the at least one FSM is identified when the first determined state transition is matching the second determined state transition.

8. The method of claim 6, further comprising:
providing a first set of inputs to a first of the at least two FSMs, the first set of inputs comprising results of at least two iterations of a security operation of a previous security stage; and
providing a second set of inputs to another of the at least two FSMs, the second set of inputs comprising results of at least two different iterations of the security operation of the previous security stage.

9. The method of claim 6, wherein cross checking operation of the at least two FSMs comprises:
performing an operation at a first of the at least two FSMs during a first iteration of the at least one of the plurality of security operations; and
performing an equivalent operation at a second of the at least two FSMs during a succeeding iteration of the at least one of the plurality of security operations;
where a valid state transitions is identified when the result of the operation performed by the first of the at least two FSMs is matching the result of the equivalent operation performed by the second of the at least two FSMs.

10. The method of claim 1, wherein:
executing the at least three iterations of the corresponding security operation comprises execution different ones of the at least three iterations using different hardware logic.

11. The method of claim 1, further comprising:
dual-rail encoding at least one result of at least one of the plurality of security stages.

12. The method of claim 1, further comprising:
verifying the completeness of the processing of the lifecycle state descriptors, and
verifying a final lifecycle transition at one of the plurality of security stages to verify a final lifecycle state.

13. The method of claim 1, further comprising:
providing an indication that the lifecycle information is valid in response to determining that a specified number of lifecycle states have been identified at the plurality of security stages.

14. The method of claim 1, wherein the at least three iterations comprise N iterations, wherein N is an integer and wherein operations of at least one of the plurality of security stages overlap in time with a subsequent stage of the plurality of security stages by a minimum of one iteration and a maximum of N−1 iterations.

15. A method of reading lifecycle (LC) information, wherein the LC information indicates a stage of manufacture or production of a processor stored at a non-volatile memory, comprising:
for each of a plurality of lifecycle states stored at the non-volatile memory:
executing a plurality of security stages for the lifecycle state, each of the plurality of security stages comprising at least three iterations of a corresponding security operation; and
crosschecking an Nth iteration of a first security stage with an Mth iteration of a second security stage of the plurality of security stages, where M is different from N, and reporting an error in response to the crosschecking identifying a mismatch in results of the Nth iteration of the first security stage and the Mth iteration of the second security stage.

16. An integrated circuit comprising:
a persistent storage module to store a plurality of lifecycle state descriptors;
a security module to read the lifecycle state descriptors from the persistent storage module, the security module including a plurality of security stages, each of the plurality of security stages to:
execute at least three iterations of a corresponding security operation based on a lifecycle state descriptor;
crosscheck results of the at least three iterations and reporting an error in response to the crosscheck identifying a mismatch in the results;
determine a validity of a lifecycle state transition corresponding to the lifecycle state descriptor by combining results of the at least three iterations; and
verify the lifecycle state transition by verifying an output of the security stage; and
the security module further to identify lifecycle information for the integrated circuit as invalid in response to at least one of the plurality of security stages indicating an error, wherein the LC information indicates a stage of manufacture or production of the integrated circuit.

17. The integrated circuit of claim 16, wherein each of the plurality of security stages is to execute its at least three iterations independently on based on independently stored redundant input data.

18. The integrated circuit of claim 17, further comprising an inverter to invert redundant input data for at least one iteration of a security operation of one of the plurality of security stages.

* * * * *